United States Patent
Horiuchi

(10) Patent No.: US 6,751,029 B2
(45) Date of Patent: Jun. 15, 2004

(54) ZOOM LENS IMAGE PICKUP APPARATUS

(75) Inventor: Akihisa Horiuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/396,015

(22) Filed: Mar. 25, 2003

(65) Prior Publication Data

US 2003/0189763 A1 Oct. 9, 2003

(30) Foreign Application Priority Data

Mar. 29, 2002 (JP) .......................... 2002-094444

(51) Int. Cl.⁷ .............................................. G02B 15/14
(52) U.S. Cl. ...................................... 359/687; 359/683
(58) Field of Search ................................. 359/683, 687

(56) References Cited

U.S. PATENT DOCUMENTS

| | | | |
|---|---|---|---|
| 5,189,558 A | 2/1993 | Ishii et al. | |
| 5,231,540 A | 7/1993 | Shibata | |
| 5,235,466 A | 8/1993 | Ono et al. | |
| 5,296,969 A | 3/1994 | Mihara | |
| 5,396,367 A | 3/1995 | Ono et al. | |
| 5,585,966 A | 12/1996 | Suzuki | |
| 5,940,221 A | 8/1999 | Okayama et al. | |
| 5,963,378 A | 10/1999 | Tochigi et al. | |
| 6,166,864 A | 12/2000 | Horiuchi | |
| 6,344,932 B1 * | 2/2002 | Horiuchi | 359/687 |
| 6,392,817 B1 * | 5/2002 | Horiuchi | 359/687 |
| 6,414,800 B1 | 7/2002 | Hamano | |

FOREIGN PATENT DOCUMENTS

| | | |
|---|---|---|
| JP | 5-19165 | 1/1993 |
| JP | 5-60973 | 3/1993 |
| JP | 5-60974 | 3/1993 |
| JP | 5-72474 | 3/1993 |
| JP | 5-107473 | 4/1993 |
| JP | 5-297275 | 11/1993 |
| JP | 6-130297 | 5/1994 |
| JP | 7-128619 | 5/1995 |
| JP | 7-199124 | 8/1995 |
| JP | 7-270684 | 10/1995 |
| JP | 7-318804 | 12/1995 |
| JP | 8-292369 | 11/1996 |
| JP | 8-304700 | 11/1996 |
| JP | 11-305124 | 11/1999 |
| JP | 2000-206407 | 7/2000 |
| JP | 2001-42213 | 2/2001 |

* cited by examiner

Primary Examiner—Scott J. Sugarman
(74) Attorney, Agent, or Firm—Morgan & Finnegan, LLP

(57) ABSTRACT

A small zoom lens system which realizes a high magnification ratio and high optical performance is disclosed. The zoom lens system comprises, in order from a front side to a rear side, a first lens unit which has a positive power, a second lens unit which has a negative power, a third lens unit which has a positive power, and a fourth lens unit which has a positive power. The lens unit and the fourth lens unit are moved in an optical axis direction during zooming. The aforementioned object is achieved by specifying the configuration the second lens unit or specifying an effective diameter of the first or second lens unit.

23 Claims, 10 Drawing Sheets

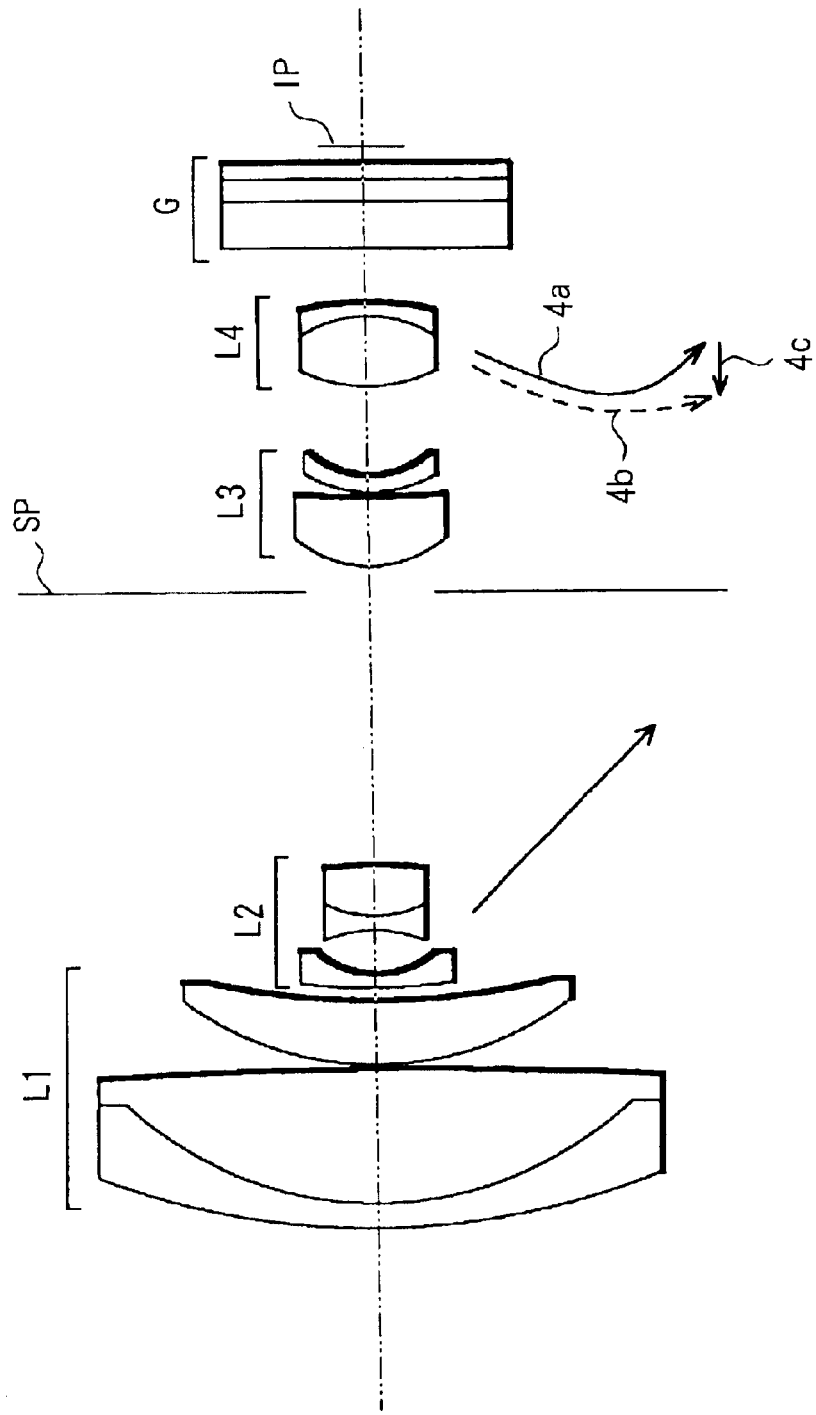

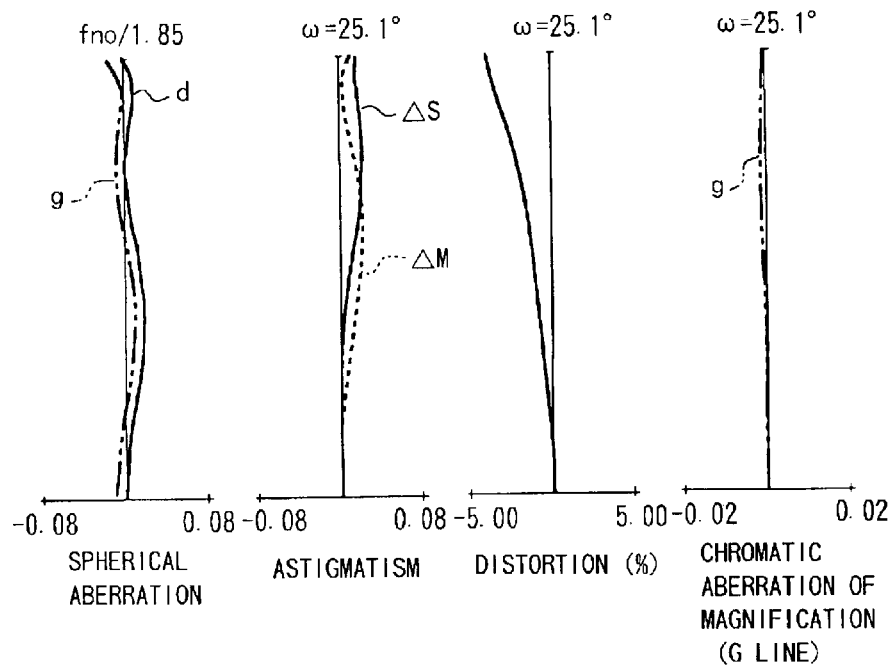
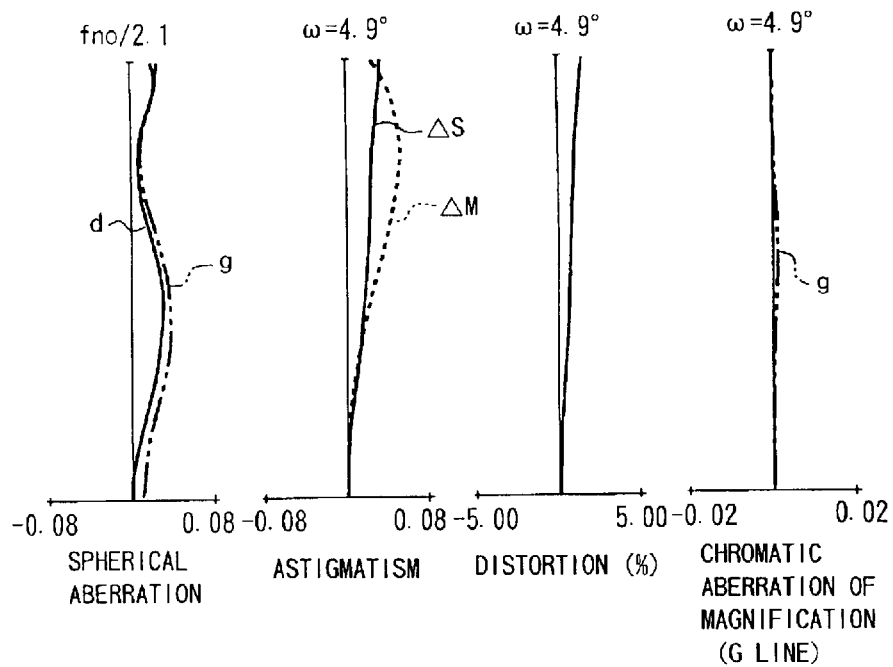

ZOOM LENS IMAGE PICKUP APPARATUS

BACKGROUND OF THE INVENTION

1. Field of the Invention

The present invention relates to a zoom lens, and more particularly, to a zoom lens which is preferable for use in an optical apparatus such as a video camera, a digital camera, a film camera, and a broadcasting camera.

2. Description of the Related Art

In recent years, a four unit zoom lens of a rear focus type is known as a zoom lens for use in a video camera, a digital camera, and an electronic still camera which use a solid-state image pickup element, and a camera which uses a film. The zoom lens is configured to have, in order from an object side, a first lens unit which has a positive refractive power and remains stationary during zooming and focusing, a second lens unit which has a negative refractive power and is movable during zooming to provide variable magnification, a third lens unit which has a positive refractive power and remains stationary during zooming and focusing, and a fourth lens unit which has a positive refractive power and is movable during zooming to compensate for variations of an image plane associated with varied magnification and is movable for focusing. Such a zoom lens has been proposed, for example, in Japanese Patent Application Laid-Open No. 1995-270684 (corresponding to U.S. Pat. No. 5,963,378), Japanese Patent Application Laid-Open No. 1995-318804 (corresponding to U.S. Pat. No. 5,963,378), Japanese Patent Application Laid-Open No. 1996-292369 (corresponding to U.S. Pat. No. 5,940,221), and Japanese Patent Application Laid-Open No. 1999-305124 (corresponding to U.S. Pat. No. 6,166,864).

In addition, a four unit zoom lens of a rear focus type which has an aspheric surface has been proposed in Japanese Patent Application Laid-Open No. 1993-72474 (corresponding to U.S. Pat. No. 5,235,466). In the zoom lens, a second lens unit is composed of a meniscus negative lens, a biconcave negative lens, and a positive lens. A third lens unit is composed of a single lens having one or more aspheric surfaces. A fourth lens unit is composed of a lens having one or more aspheric surfaces.

Attempts have been made to reduce the size of a third lens unit and a fourth lens unit which correspond to an image forming system in the four unit zoom lens of a rear focus type. For example, a known zoom lens has a third lens unit which is composed of a positive lens and a negative lens in order from an object and which is formed as a telephoto lens type by shifting the principal point of the third lens unit toward the object to reduce the actual distance between the third lens unit and the fourth lens unit to achieve a smaller size. Such a zoom lens has been proposed, for example, in Japanese Patent Application Laid-Open No. 1993-19165 (corresponding to U.S. Pat. No. 5,231,540), Japanese Patent Application Laid-Open No. 1993-297275 (corresponding to U.S. Pat. No. 5,396,367), Japanese Patent Application Laid-Open No. 1993-60973 (corresponding to U.S. Pat. No. 5,296,969), Japanese Patent Application Laid-Open No. 1993-60974, Japanese Patent Application Laid-Open No. 1993-107473, Japanese Patent Application Laid-Open No. 1994-130297 (corresponding to U.S. Pat. No. 5,396,367), Japanese Patent Application Laid-Open No. 1996-292369 (corresponding to U.S. Pat. No. 5,940,221), Japanese Patent Application Laid-Open No. 1996-304700, Japanese Patent Application Laid-Open No. 1999-305124 (corresponding to U.S. Pat. No. 6,166,864), Japanese Patent Application Laid-Open No. 2000-206407 (corresponding to U.S. Pat. No. 6,344,932), U.S. Pat. No. 5189558, and U.S. Pat. No. 5,189,558.

On the other hand, various vibration isolation optical systems (zoom lens) have been proposed which have a function of preventing an image blur (a vibration isolation function) caused when camera shake occurs due to vibrations transmitted to an image-taking system.

For example, Japanese Patent Application No. 7-128619 discloses a four unit zoom lens consisting of, in order from an object side, a first, second, third, and fourth lens unit having positive, negative, positive, and positive refractive power, respectively. In this zoom lens, the third lens unit comprises two lens units having positive and negative refractive powers in which the lens unit having the positive refractive power is caused to vibrate to correct an image blur. Japanese Patent Application No. 7-199124 (corresponding to U.S. Pat. No. 5,585,966) discloses a four unit zoom lens consisting of, in order from an object side, a first, second, third, and fourth lens unit having positive, negative, positive, and positive refractive power, respectively. In this zoom lens, the entire third lens unit is caused to vibrate to correct an image blur.

The present applicants have disclosed, in Japanese Patent Application No. 2001-42213 (corresponding to U.S. Pat. No. 5,414,800), a four unit zoom lens consisting of a first, second, third, and fourth lens units having positive, negative, positive, and positive refractive power, respectively, in which the entire third lens unit is caused to vibrate to correct an image blur.

In a zoom lens for use in a digital camera and a video camera, high optical performance yet compact design is needed in association with the trends toward a smaller size of the camera body and an increased number of pixels of an image pickup element in recent years. In addition, it is desirable for a video camera to record still images with high quality.

Typically, in a zoom lens, a higher refractive power of each lens unit results in a less amount of movement of each lens unit required to achieve a predetermined magnification ratio. Thus, high variable magnification and a reduced overall length of the lens can be provided.

Merely increasing the refractive power of each lens unit, however, causes larger variations in aberration during zooming or focusing. Higher accuracy is also needed in manufacture. For example, when lenses have relatively misaligned axes in a lens unit, the image forming capability is significantly degraded as compared with a zoom lens having a lower refractive power.

The rear focus scheme can provide advantages such as quick focusing while the size of the entire lens system is reduced.

On the other hand, high variable magnification is difficult to achieve, and large variations in aberration tend to occur in focusing. It is considerably difficult to provide high optical performance throughout the object distance from an object at infinity to an object at a short distance.

Especially when high variable magnification is intended, it is significantly difficult to provide high optical performance throughout its entire range of variable magnification and throughout the object distance.

SUMMARY OF THE INVENTION

It is an object of the present invention to provide a zoom lens which has a smaller size of its entire lens system and achieves high optical performance even with a high variable magnification ratio.

To achieve the aforementioned object, according to an aspect of the present invention, the zoom lens system comprises, in order from a front side (an object side in the case of an image-taking optical system) to a rear side (an image side in the case of an image-taking optical system), a first lens unit which has a positive power (power is the reciprocal of a focal length), a second lens unit which has a negative power, a third lens unit which has a positive power, and a fourth lens unit which has a positive power, wherein the second lens unit and the fourth lens unit are moved in an optical axis direction during zooming. The configuration of the second lens unit is specified, or the effective diameter of the first or second lens unit is specified, as described in embodiments described later.

BRIEF DESCRIPTION OF THE DRAWINGS

FIG. 5 is a section view of lenses at the wide angle end of a zoom lens in Embodiment 2:

FIG. 6 shows various aberrations at the wide angle end of the zoom lens in Embodiment 2;

FIG. 7 shows various aberrations at an intermediate zoom position of the zoom lens in Embodiment 2;

DESCRIPTION OF THE PREFERRED EMBODIMENTS

Description is hereinafter made for embodiments of a zoom lens system of the present invention and an image pickup apparatus having the zoom lens with reference to the drawings.

Figure 1:
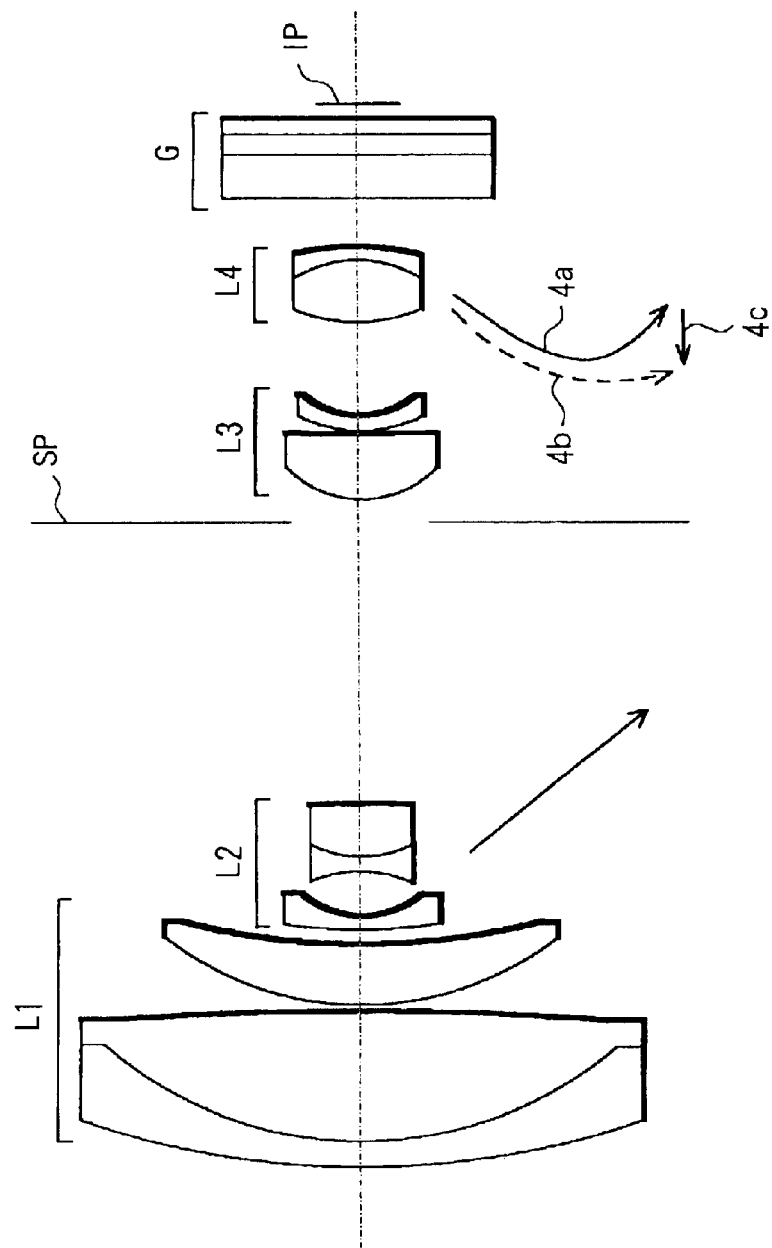
FIG. 1 is a section view of lenses at the wide angle end of a zoom lens in Embodiment 1.
Figure 2:
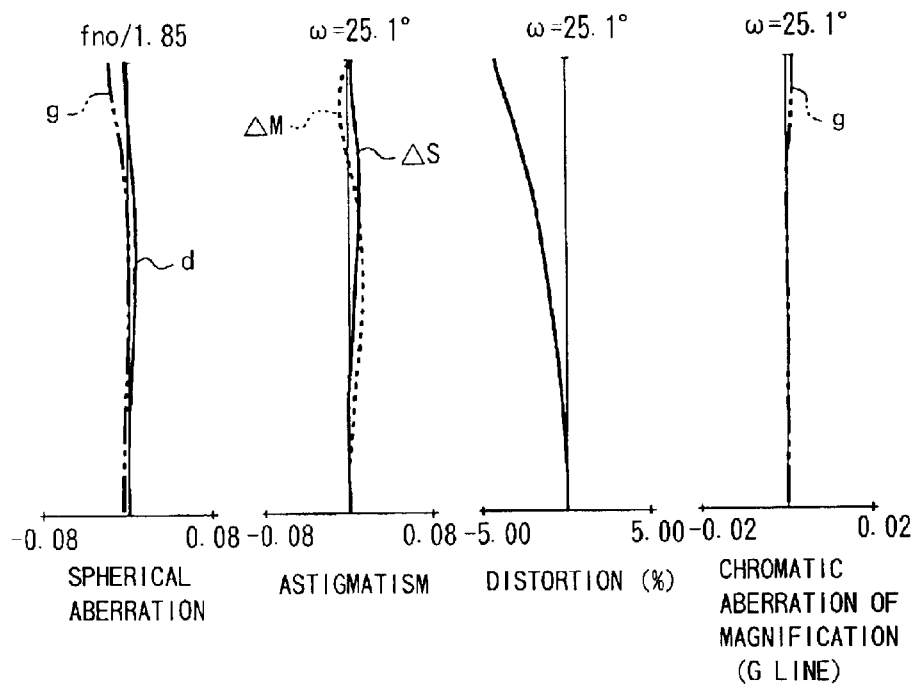
FIG. 2 shows various aberrations at the wide angle end of the zoom lens in Embodiment 1.
Figure 3:
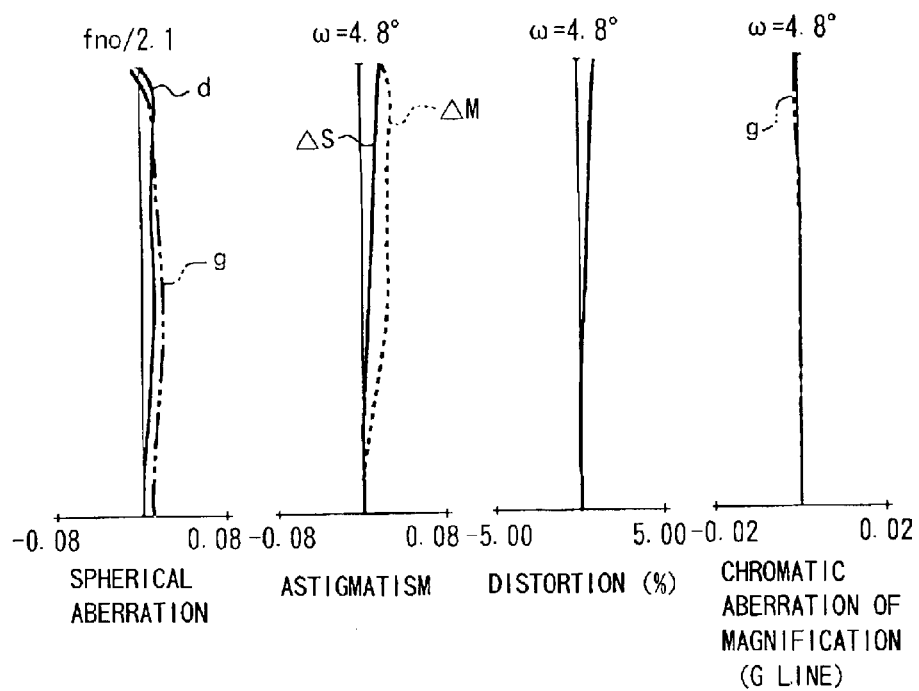
FIG. 3 shows various aberrations at an intermediate zoom position of the zoom lens in Embodiment 1.
Figure 4:
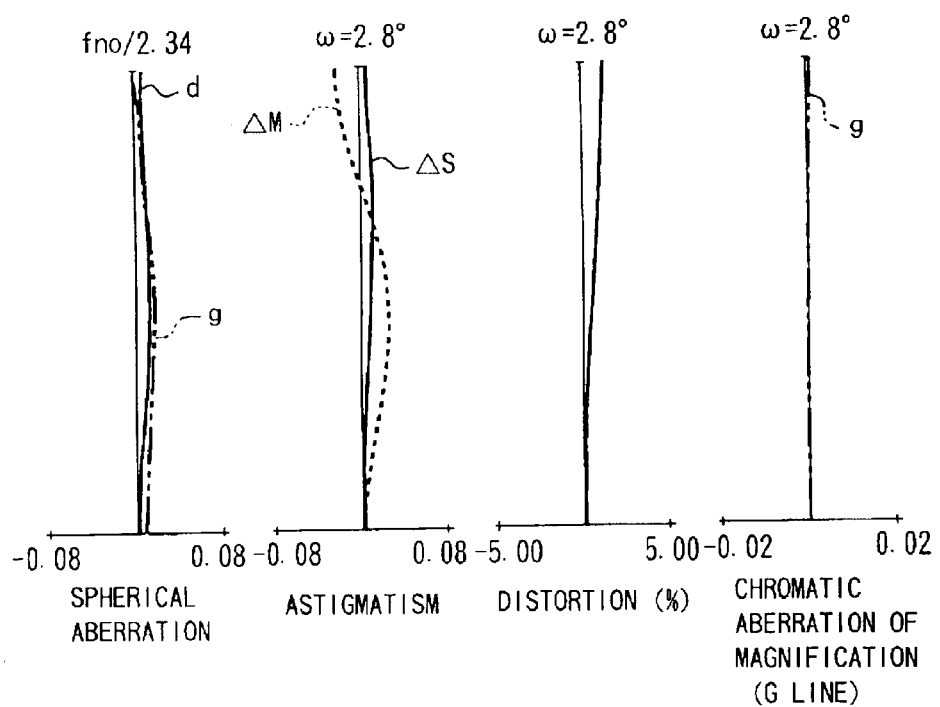
FIG. 4 shows various aberrations at the telephoto end of the zoom lens in Embodiment 1.

FIG. 1 is a section view of lenses at the wide angle end of a zoom lens in Embodiment 1. FIGS. 2, 3, and 4 show aberrations at the wide angle end, an intermediate zoom position, and the telephoto end of the zoom lens in Embodiment 1, respectively.

Figure 8:
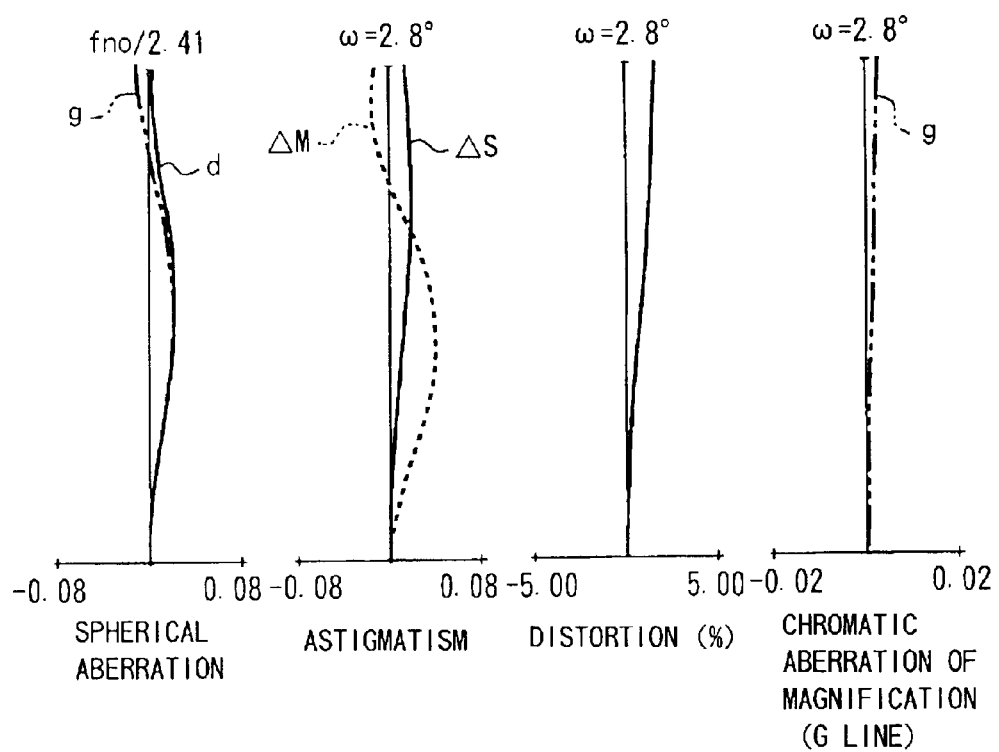
FIG. 8 shows various aberrations at the telephoto end of the zoom lens in Embodiment 2.

FIG. 5 is a section view of lenses at the wide angle end of a zoom lens in Embodiment 2. FIGS. 6, 7, and 8 show aberrations at the wide angle end, an intermediate zoom position, and the telephoto end of the zoom lens in Embodiment 2, respectively.

Figure 9:
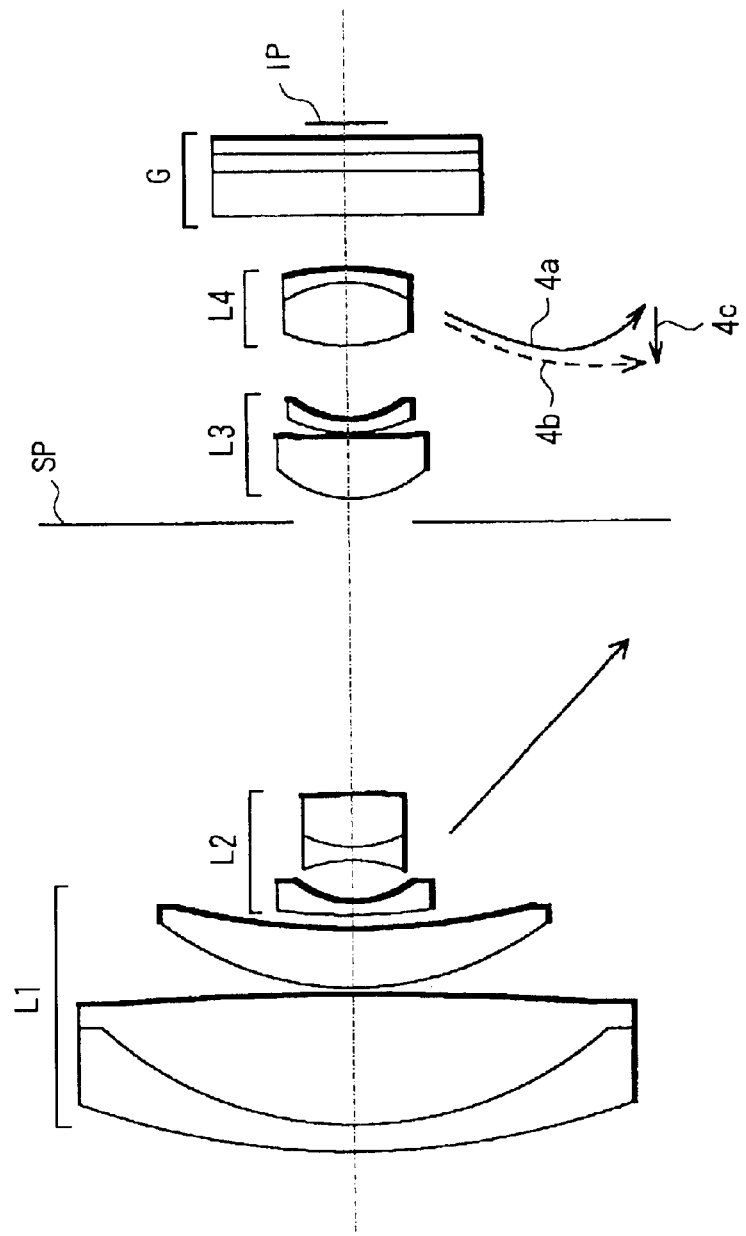
FIG. 9 is a section view of lenses at the wide angle end of a zoom lens in a third embodiment.
Figure 10:
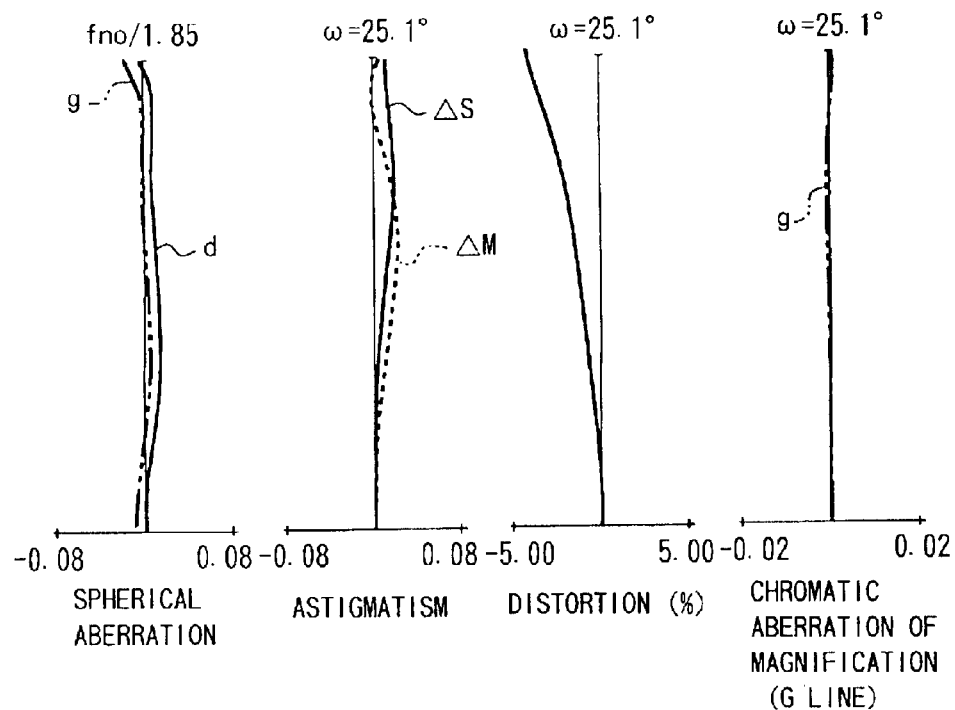
FIG. 10 shows various aberrations at the wide angle end of the zoom lens in Embodiment 3.
Figure 11:
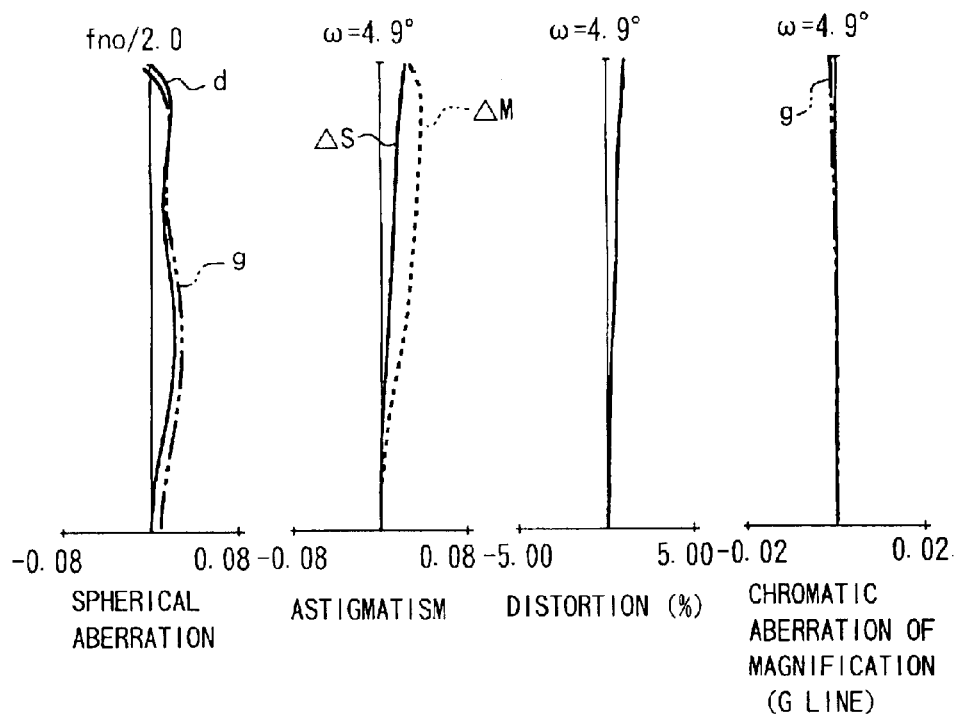
FIG. 11 shows various aberrations at an intermediate zoom position of the zoom lens in Embodiment 3.
Figure 12:
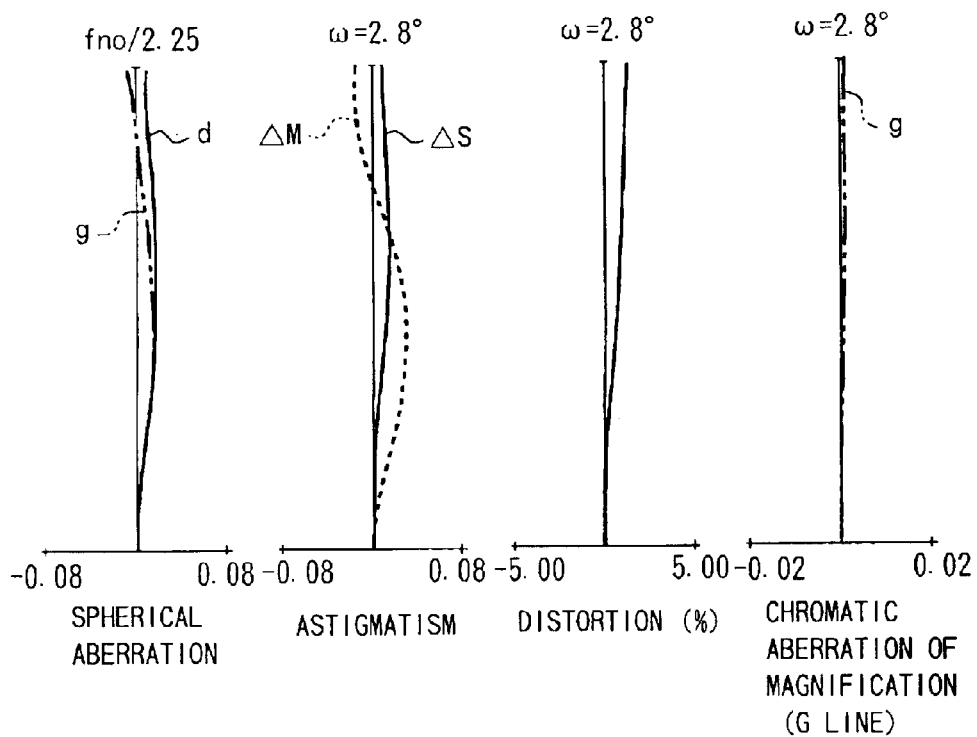
FIG. 12 shows various aberrations at the telephoto end of the zoom lens in Embodiment 3.

FIG. 9 is a section view of lenses at the wide angle end of a zoom lens in Embodiment 3. FIGS. 10, 11, and 12 show aberrations at the wide angle end, an intermediate zoom position, and the telephoto end of the zoom lens in Embodiment 3, respectively.

Figure 13:
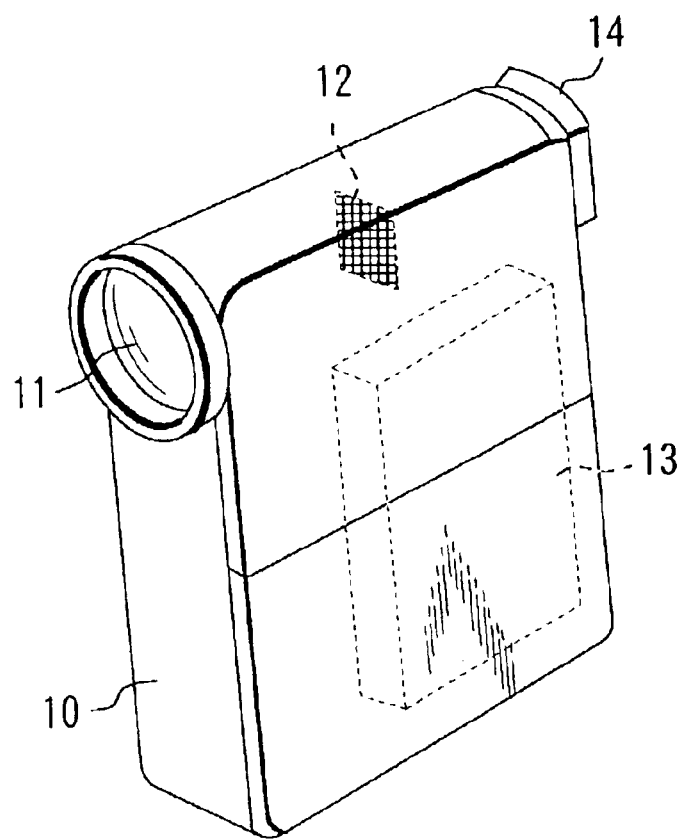
FIG. 13 is a schematic diagram showing main portions of a video camera.

FIG. 13 is a schematic diagram showing main portions of a video camera (image pickup apparatus) having the zoom lens of any of Embodiments 1 to 3 as an image-taking lens.

In the section view of the lenses illustrating the zoom lens in each embodiment, L1 shows a first lens unit having a positive refractive power (power, that is, the reciprocal of a focal length), L2 a second lens unit having a negative refractive power, L3 a third lens unit having a positive refractive power, and L4 a fourth lens unit having a positive refractive power. SP shows an aperture stop located in front of the third lens unit L3 and in the rear of the second lens unit L2. In each section view of the lenses, the left side corresponds to an object side (front side), while the right side corresponds to an image side (rear side).

G shows an optical block corresponding to an optical filter, a faceplate or the like. IP shows an image plane at which an imaging surface of a solid-state image pickup element (photoelectric conversion element) such as a CCD sensor and a CMOS sensor is located.

In each aberration diagram, d and g show a d line and a g line, respectively. ΔM and ΔS show a meridional image plane and a sagittal image plane, respectively. The chromatic aberration of magnification is represented by the g line.

In each embodiment, for zooming from the wide angle end to the telephoto end, the second lens unit L2 is moved toward the image side to provide variable magnification, and the fourth lens unit L4 is moved to correct variations of the image plane resulting from the varied magnification, as indicated by arrows. The rear focus scheme is employed in which the fourth lens unit L4 is moved on an optical axis to achieve focusing. Thus, the track of movement of the fourth lens unit during zooming depends on an object distance. A solid line curve 4a and a dotted line curve 4b associated with the fourth lens unit L4 show the tracks of movement thereof during zooming from the wide angle end to the telephoto end when an object at infinity and an object at a short distance are brought into focus, respectively. In Embodiment 1, although the first lens unit L1 and the third lens unit L3 remain stationary in the optical axis direction during zooming and focusing, they may be moved as required for correcting aberration.

As shown by the curves 4a and 4b, the fourth lens unit L4 moves along the convex tracks toward the object side during zooming from the wide angle end to the telephoto end. This attains the effective use of the space between the third lens unit L3 and the fourth lens unit L4 to effectively achieve a reduction in the overall length of the lenses. In addition, when the focus is shifted to an object at a short distance from an object at infinity at the telephoto end, for example, the fourth lens unit L4 is moved forward as shown by an arrow 4c.

In each embodiment, a part or all of the third lens unit L3 is moved (displaced) to have a component perpendicular to the optical axis to correct an image blur caused when the entire optical system vibrates. Thus, vibration isolation is provided without adding an optical member such as a variable apical angle prism or a lens unit for vibration isolation to prevent the entire optical system from being increased in size.

Next, the characteristics of the lens configurations of the respective embodiments are described.

The second lens unit L2 consists of one or more negative single lenses and a cemented lens formed by cementing a negative lens to a positive lens. The following conditional expression is satisfied:

$$1.04 < |Rs1/Rs2| < 1.14 \quad (1)$$

where Rs1 and R2s represent the radii of curvature of the object-side and image-side lens surfaces in the negative lens of the cemented lens, respectively.

In the aforementioned zoom lens of the four unit type, it is necessary to reduce the focal length (or increase the refractive power) of the second lens unit L2 responsible for the variable magnification effect in order to reduce the size of the entire lens system. However, simply reducing the focal length of the second lens unit L2 leads to a significant burden of refractive power on the second lens unit L2, thereby making it difficult to maintain favorable optical performance. To address this, the lens configuration and the lens shape of the second lens unit L2 are specified as described above, and the radii of curvature of the lens surfaces are set to satisfy the conditional expression (1). Thus, the off-axial optical performance, especially flare, can be corrected well.

The following conditional expression is satisfied:

$$6.6 < \phi 1F/fw < 8.5 \quad (2)$$

where $\phi 1F$ represents the effective diameter of the lens surface closest to the object side of the first lens unit L1, and fw represents the focal length of the entire system at the wide angle end.

The conditional expression (2) is preferable for using the zoom lens in an optical apparatus and achieving a reduction in size of the entire apparatus. If the effective diameter of the lens surface closest to the object side of the first lens unit L1 is larger, the resulting value of $\phi 1F/fw$ is also larger than the upper limit in the conditional expression (2), the entire lens system has a large size. On the other hand, a small value of the effective diameter, which causes the value of $\phi 1F/fw$ less than the lower limit, is not preferable since an amount of light is insufficient on the periphery of the image plane to create a dark portion on the periphery of an image.

The following conditional expression is satisfied:

$$1.47 < \phi 1F/\phi 1R < 1.77 \quad (3)$$

where $\phi 1F$ represents the effective diameter of the lens surface closest to the object side of the first lens unit L1, and $\phi 1R$ represents the effective diameter of the lens surface closest to the image side of the first lens unit L1.

The conditional expression (3) is preferable for using the zoom lens in an optical apparatus and providing favorable optical performance while achieving a reduction in size of the apparatus. If the ratio between the effective diameters of the lens surface closest to the object side and the lens surface closest to the image side of the first lens unit L1 is larger than the upper limit in the conditional expression (3), it is difficult to satisfactorily correct axial chromatic aberration at the telephoto end. On the other hand, a small value of the ratio less than the lower limit is not preferable since the off-axial performance is degraded at an intermediate focal length in zooming.

The following conditional expression is satisfied:

$$3.2 < \phi 1F/\phi 2F < 4.4 \quad (4)$$

where $\phi 1F$ represents the effective diameter of the lens surface closest to the object side of the first lens unit L1 and $\phi 2F$ represents the effective diameter of the lens surface closest to the object side of the second lens unit L2.

The conditional expression (4) is preferable for using the zoom lens in an optical apparatus and providing favorable optical performance while achieving a reduction in size of the entire apparatus. If the ratio between the effective diameters of the lens surface closest to the object side of the first lens unit L1 and the lens surface closest to the object side of the second lens unit L2 is larger than the upper limit in the conditional expression (4), it is difficult to ensure a sufficient amount of light on the periphery of the image plane at an intermediate focal length in zooming. On the other hand, a small value of the ratio less than the lower limit is not preferable since the off-axial performance is degraded at an intermediate focal length in zooming.

The following conditional expressions are satisfied:

$$1.8 < f1/fA < 2.4 \quad (5)$$

$$0.1 < |f2/fA| < 0.44 \quad (6)$$

$$1.0 < f3/f4 < 1.4 \quad (7)$$

$$0.2 < |\beta 4T| < 0.32 \quad (8)$$

where fw and ft represent focal lengths of the entire system at the wide angle end and the telephoto end, respectively, fi represents a focal length of the i-th lens unit, $\beta 4T$ represents an image forming magnification of the fourth lens unit L4 when an object at infinity is brought into focus at the telephoto end, and fA is represented by:

$$fA = \sqrt{fw \cdot ft}.$$

The conditional expression (5) is provided for setting an appropriate focal length of the first lens unit L1. If the focal length of the first lens unit L1 is longer, the resulting value of f1/fA is also longer than the upper limit in the conditional expression (5), the focal length of the entire lens system is large, and it is difficult to ensure a desired focal length. On the other hand, a small value of the focal length which causes the value of f1/fA to be less than the lower limit is not preferable since a significant burden of refractive power is placed on the first lens unit L1 to fail to provide favorable optical performance, and specifically, spherical aberration and chromatic aberration are large at the telephoto end.

The conditional expression (6) is provided for setting an appropriate focal length (in other words, a power which is the reciprocal of the focal length) in the second lens unit L2. A larger value of the focal length of the second lens unit L2 which causes the value of 1f2/fA1 to be larger than the upper limit in the conditional expression (6) is preferable in terms of correction of aberration. In this case, however, the second lens unit L2 must be moved over a large distance to provide a desired zoom ratio, which results in an increased size of the entire lens system and thus is not preferable. On the other hand, if the focal length is shorter, the resulting value of 1f2/fA1 is also less than the lower limit, the Petzval sum is a negative large number to cause a distorted image plane. Thus, favorable optical performance is difficult to maintain.

The conditional expression (7) defines optimal distribution of refractive power to reduce the size of the third lens unit L3 and the fourth lens unit L4 which correspond to the image forming system. Especially, the conditional expression (7) is provided for causing luminous flux from the third lens unit L3 to be incident on the fourth lens unit L4 substantially in an afocal manner to ensure an optimal back focus when the third lens unit L3 and the fourth lens unit L4 are placed with an optimal spacing between them.

If the ratio of f3/f4 exceeds the upper limit in the conditional expression (7), the luminous flux from the third lens unit L3 is not incident in the afocal manner and the fourth lens unit L4 is increased in size. In addition, variations in aberration are disadvantageously large in association with the movement of the fourth lens unit L4. On the other hand, if the ratio is less than the lower limit, the refractive power of the fourth lens unit L4 is low to require a larger moving amount for focusing, increasing the overall length.

The conditional expression (8) relates to an image forming magnification of the fourth lens unit L4. Setting the magnification in the range of the conditional expression (8) reduces the length from the third lens unit L3 to the fourth lens unit L4 (these lens units correspond to the imaging system) and to the image plane. If the upper limit in the conditional expression (8) is exceeded, the back focus is disadvantageously short and interferes with an optical member (for example, a solid-state image pickup element in the case of an image pickup apparatus) disposed at the image plane. On the other hand, a small value of the magnification less than the lower limit is not preferable since the back focus is significantly long to increase the overall length of the lenses.

The second lens unit L2 consists of one or more negative lenses and the cemented lens formed by cementing a negative lens to a positive lens. The following conditional expression is satisfied:

$$35 = va = 47 \tag{9}$$

where va represents the Abbe number of the material constituting the negative lens of the cemented lens.

The conditional expression (9) is provided for favorably correcting chromatic aberration occurring in the second lens unit L2 by setting 35 or more and 47 or less to the Abbe number of the material of the negative lens of the cemented lens among the lenses constituting the second lens unit L2. If the Abbe number is out of the range, correction of chromatic aberration is difficult.

When the zoom lens in each embodiment is employed in an optical apparatus which has a specified effective size of image forming range, such as a digital camera, a video camera, and a film camera, then the following conditional expression is satisfied:

$$\tan \omega w = 0.62 \tag{10}$$

where ωw represents the maximum field angle of the zoom lens determined by the effective size.

The conditional expression (10) is provided for setting an appropriate field angle determined by the focal length of the zoom lens and the effective size of the solid-state image pickup element or the like to provide favorable optical performance over the entire image plane when the zoom lens of each embodiment is employed in the optical apparatus.

If the field angle is out of the range in the conditional expression (10), correction of off-axial aberration is difficult, and high optical performance is difficult to achieve over the entire image plane.

In each embodiment, it is more preferable to set the ranges of the numerical values in the aforementioned conditional expressions as follows.

$$1.05 < |Rs1/Rs2| < 1.13 \tag{1a}$$

$$6.8 < \phi 1F/fw < 8.3 \tag{2a}$$

$$1.50 < \phi 1F/\phi 1R < 1.70 \tag{3a}$$

$$3.5 < \phi 1F/\phi 2F < 4.1 \tag{4a}$$

$$1.9 < f1/fA < 2.3 \tag{5a}$$

$$0.2 < |f2/fA| < 0.42 \tag{6a}$$

$$1.1 < f3/f4 < 1.3 \tag{7a}$$

$$0.22 < |\beta 4T| < 0.31 \tag{8a}$$

$$35 = va = 46 \tag{9a}$$

$$\tan \omega w = 0.6 \tag{10a}$$

The third lens unit L3 consists of three or less lenses which have, in order from the object side, a positive lens having a convex surface toward the object side and having one or more aspheric surfaces, and toward the side closest to the image, a meniscus negative lens having a concave surface on the image side.

To further reduce the size of the entire lens system, it is important for the third lens unit L3 having a positive refractive power to sufficiently narrow the diameter of luminous flux before exit. In the zoom lens of each embodiment, divergent light from the second lens unit L2 is incident on the third lens unit L3, so that a significant burden is placed on the positive lens of the third lens unit L3 to narrow the luminous flux before exit. To avoid this, the positive lens of the third lens unit L3 is formed to have aspheric surfaces on both sides to maintain favorably restricted aberration and narrow the luminous flux. This can further reduce the spacing between the third lens unit L3 and the fourth lens unit L4 to more effectively reduce the size of the entire lens system. Specifically, the divergent light is incident on the lens surface closer to the object side of the lens having the aspheric surfaces on both sides, and the incident light is converged by the lens surface. Then, the resulting convergent light is incident on the lens surface closer to the image side of the lens, thereby favorably correcting aberration.

The fourth lens unit L4 has a cemented lens formed by cementing a biconvex positive lens which has one or more aspheric surfaces to a negative lens.

This reduces variations of the image plane or chromatic aberration in focusing by the fourth lens unit L4.

The first lens unit L1 is composed of a negative lens having a concave surface with a larger absolute value of refractive power on the image side than on the object side, a first positive lens, and a meniscus second positive lens having a convex surface toward the object side, in order from the object. The negative lens and the first positive lens are independent of or cemented to each other. Thus, favorable optical performance is provided.

As describe above, the zoom lens shown in each embodiment achieves a high variable magnification ratio and high optical performance while the size of the entire lens system is reduced.

Specifically, the zoom lens realized in each embodiment has high optical performance throughout the zooming range from the wide angle end to the telephoto end even with a high variable magnification ratio of ten, as well as throughout the object distance from an object at infinity to an object at an extremely close range. Additionally, the zoom lens has a reduced number of constituent lenses even with a large aperture ratio as indicated by the F number of approximately 1.8.

Furthermore, all or a part of the third lens unit L3 is moved to have a component substantially perpendicular to the optical axis direction to correct a displacement of an object image on the image plane, thereby facilitating vibration isolation without using a special optical system for preventing displacement of images.

Next, numerical value data of numerical examples 1 to 3 are shown corresponding to the embodiments 1 to 3, respectively. In each numerical example, i shows the order of an optical surface from the object side, Ri the radius of curvature of the i-th optical surface (i-th surface), Di the spacing between the i-th surface and the i+1-th surface, Ni and vi the refractive index and the Abbe number of the material of the i-th optical member for the d line. The four planes closest to the image side are glass blocks corresponding to faceplates, filters or the like. f represents the focal length, Fno the F number, and ωhalfof the field angle. An aspheric shape is represented by:

$$X = \frac{h^2/R}{1 + \{1 - (1+K)(h/R)^2\}^{1/2}} + Bh^4 + Ch^6 + Dh^8 + Eh^{10} + Fh^{12}\cdots$$

where κ is the conic constant, B, C, D, E, F, ... are aspheric coefficients, x is the displacement in the optical axis direction at a height h from the optical axis relative to the plane vertex, and R is the radius of curvature. "e-0X" means "x $10^{-x}$." Table 1 shows the values calculated with the aforementioned conditional expressions in the respective numerical examples.

Numerical Example 1
f = 1~9.55  Fno = 1.85~2.34  2ω = 50.3~5.6

| | | | |
|---|---|---|---|
| R1 = 12.319 | D1 = 0.37 | N1 = 1.846660 | v1 = 23.9 |
| R2 = 5.514 | D2 = 1.92 | N2 = 1.696797 | v2 = 55.5 |
| R3 = −50.721 | D3 = 0.06 | | |
| R4 = 4.615 | D4 = 0.91 | N3 = 1.696797 | v3 = 55.5 |
| R5 = 11.760 | D5 = Variable | | |
| R6 = 9.938 | D6 = 0.19 | N4 = 1.882997 | v4 = 40.8 |
| R7 = 1.363 | D7 = 0.64 | | |
| R8 = −1.784 | D8 = 0.19 | N5 = 1.743997 | v5 = 44.8 |
| R9 = 1.675 | D9 = 0.79 | N6 = 1.846660 | v6 = 23.9 |
| R10 = −8.099 | D10 = Variable | | |
| R11 = Aperature Stop | D11 = 0.35 | | |
| R12* = 1.490 | D12 = 0.93 | N7 = 1.583126 | v7 = 59.4 |
| R13* = −79.680 | D13 = 0.05 | | |
| R14 = 2.150 | D14 = 0.21 | N8 = 1.846660 | v8 = 23.9 |
| R15 = 1.317 | D15 = Variable | | |
| R16* = 2.181 | D16 = 0.91 | N9 = 1.583126 | v9 = 59.4 |
| R17 = −1.765 | D17 = 0.19 | N10 = 1.846660 | v10 = 23.9 |
| R18 = −4.269 | D18 = Variable | | |
| R19 = ∞ | D19 = 0.62 | N11 = 1.516800 | v11 = 64.2 |
| R20 = ∞ | D20 = 0.29 | N12 = 1.552320 | v12 = 63.4 |
| R21 = ∞ | D21 = 0.19 | N13 = 1.556710 | v13 = 58.6 |
| R22 = ∞ | | | |

| Variable | Focal length | | |
|---|---|---|---|
| Separation | 1.00 | 5.57 | 9.55 |
| D5 | 0.19 | 3.17 | 3.73 |
| D10 | 4.12 | 1.14 | 0.58 |
| D15 | 1.33 | 0.63 | 1.06 |
| D18 | 0.70 | 1.40 | 0.97 |

*represents aspheric surface
Aspheric conditions
R12 k=−2.61343e+00 B=8.32025e−02 C=−1.74617e−02 D=9.65404e−03 E=6.65385e−03 F=−3.59193e−04
R13 k=1.01526e+03 B=2.88979e−02 C=2.01318e−03 D=1.70037e−02 E=−1.52363e−03 F=8.59177e−03
R16 k=−1.34586e+01 B=1.31318e−01 C=−3.34354e−02 D=−2.12696e−01 E=3.85585e−01 F=−2.06411e−01

Numerical Example 2
f = 1~9.50  Fno = 1.85~2.41  2ω = 50.3~5.7

| | | | |
|---|---|---|---|
| R1 = 10.222 | D1 = 0.32 | N1 = 1.846660 | v1 = 23.9 |
| R2 = 4.969 | D2 = 1.79 | N2 = 1.696797 | v2 = 55.5 |
| R3 = −70.432 | D3 = 0.05 | | |
| R4 = 4.232 | D4 = 0.90 | N3 = 1.696797 | v3 = 55.5 |
| R5 = 10.787 | D5 = Variable | | |
| R6 = 9.382 | D6 = 0.19 | N4 = 1.882997 | v4 = 40.8 |
| R7 = 1.216 | D7 = 0.59 | | |
| R8 = −1.600 | D8 = 0.19 | N5 = 1.751127 | v5 = 38.7 |
| R9 = 1.484 | D9 = 0.68 | N6 = 1.846660 | v6 = 23.9 |
| R10 = −5.975 | D10 = Variable | | |
| R11 = Aperature Stop | D11 = 0.35 | | |
| R12* = 1.542 | D12 = 0.95 | N7 = 1.583126 | v7 = 59.4 |
| R13* = −64.251 | D13 = 0.05 | | |
| R14 = 1.898 | D14 = 0.21 | N8 = 1.846660 | v8 = 23.9 |
| R15 = 1.251 | D15 = Variable | | |
| R16* = 2.091 | D16 = 0.95 | N9 = 1.583126 | v9 = 59.4 |
| R17 = −1.610 | D17 = 0.19 | N10 = 1.846660 | v10 = 23.9 |
| R18 = −3.873 | D18 = Variable | | |
| R19 = ∞ | D19 = 0.62 | N11 = 1.516800 | v11 = 64.2 |
| R20 = ∞ | D20 = 0.29 | N12 = 1.552320 | v12 = 63.4 |
| R21 = ∞ | D21 = 0.19 | N13 = 1.556710 | v13 = 58.6 |
| R22 = ∞ | | | |

| Variable | Focal length | | |
|---|---|---|---|
| Separation | 1.00 | 5.51 | 9.50 |
| D5 | 0.17 | 2.81 | 3.31 |
| D10 | 3.70 | 1.06 | 0.56 |
| D15 | 1.20 | 0.61 | 1.13 |
| D18 | 0.70 | 1.29 | 0.77 |

*represents aspheric surface
Aspheric conditions
R12 k=−2.78551e+00 B=7.96262e−02 C=−9.26559e−03 D=−7.32430e−03 E=9.95008e−03 F=0.00000e+00
R13 k=−2.52164e+04 B=2.19111e−02 C=−4.00900e−03 D=1.60193e−02 E=−3.52999e−05 F=0.00000e+00
R16 k=−1.37912e+01 B=1.52088e−01 C=−3.91705e−02 D=−2.28500e−01 E=3.94277e−01 F=−1.97608e−01

Numerical Example 3
f = 1~9.50  Fno = 1.85~2.25  2ω = 50.3~5.7

| | | | |
|---|---|---|---|
| R1 = 11.580 | D1 = 0.37 | N1 = 1.846660 | v1 = 23.9 |
| R2 = 5.420 | D2 = 1.95 | N2 = 1.696797 | v2 = 55.5 |
| R3 = −57.296 | D3 = 0.05 | | |
| R4 = 4.421 | D4 = 0.95 | N3 = 1.696797 | v3 = 55.5 |
| R5 = 10.702 | D5 = Variable | | |
| R6 = 9.879 | D6 = 0.19 | N4 = 1.882997 | v4 = 40.8 |
| R7 = 1.265 | D7 = 0.65 | | |
| R8 = −1.638 | D8 = 0.19 | N5 = 1.757028 | v5 = 36.8 |
| R9 = 1.510 | D9 = 0.73 | N6 = 1.846660 | v6 = 23.9 |
| R10 = −4.811 | D10 = Variable | | |
| R11 = Aperature Stop | D11 = 0.35 | | |
| R12* = 1.530 | D12 = 0.93 | N7 = 1.583126 | v7 = 59.4 |
| R13* = −295.028 | D13 = 0.05 | | |
| R14 = 2.002 | D14 = 0.21 | N8 = 1.846660 | v8 = 23.9 |
| R15 = 1.283 | D15 = Variable | | |
| R16* = 2.135 | D16 = 0.93 | N9 = 1.583126 | v9 = 59.4 |
| R17 = −1.587 | D17 = 0.19 | N10 = 1.846660 | v10 = 23.9 |
| R18 = −3.839 | D18 = Variable | | |
| R19 = ∞ | D19 = 0.62 | N11 = 1.516800 | v11 = 64.2 |
| R20 = ∞ | D20 = 0.29 | N12 = 1.552320 | v12 = 63.4 |
| R21 = ∞ | D21 = 0.19 | N13 = 1.556710 | v13 = 58.6 |
| R22 = ∞ | | | |

| Variable | Focal length | | |
|---|---|---|---|
| Separation | 1.00 | 5.48 | 9.50 |
| D5 | 0.17 | 3.06 | 3.61 |
| D10 | 4.00 | 1.11 | 0.56 |

-continued

| | Numerical Example 3 | | |
| --- | --- | --- | --- |
| f = 1~9.50 | Fno = 1.85~2.25 | 2ω = 50.3~5.7 | |
| D15 | 1.11 | 0.60 | 1.11 |
| D18 | 0.70 | 1.21 | 0.70 |

*represents aspheric surface
Aspheric conditions
R12 k=−2.74811e+00 B=8.27221e−02 C=−1.26201e−02 D=−2.76345e−03
E=9.55652e−03 F=0.00000e+00
R13 k=−2.93487e+03 B=2.91161e−02 C=−1.49451e−03 D=−2.75977e−03
E=1.62846e−02 F=0.00000e+00
R16 k=−1.37806e+01 B=1.44168e−01 C=−3.92382e−02 D=−2.11157e−01
E=3.79033e−01 F=−1.97113e−01

TABLE 1

| Conditional Expression | Numerical Example | | |
| --- | --- | --- | --- |
| | 1 | 2 | 3 |
| (1) | 1.07 | 1.08 | 1.09 |
| (2) | 7.64 | 7.02 | 7.74 |
| (3) | 1.57 | 1.59 | 1.61 |
| (4) | 3.65 | 3.65 | 3.75 |
| (5) | 2.20 | 2.00 | 2.15 |
| (6) | 0.39 | 0.36 | 0.40 |
| (7) | 1.17 | 1.20 | 1.23 |
| (8) | 0.24 | 0.26 | 0.30 |
| (9) | 44.8 | 38.7 | 36.8 |
| (10) | 0.47 | 0.47 | 0.47 |

Next, description is made for a video camera (an image pickup apparatus) which uses the zoom lens of the abovementioned embodiments as an image-taking optical system with reference to FIG. 13.

In FIG. 13, reference numeral 10 shows a video camera body, 11 an image-taking optical system formed of the zoom lens of the abovementioned embodiments, 12 a solid-state image pickup element (photoelectric conversion element) such as a CCD and a CMOS sensor which receives light of an object image formed by the image-taking optical system 11, 13 a memory electrically connected to the solid-state image pickup element 12 for recording the object image received by the image pickup element 12, and 14 a viewfinder for observing an object image displayed on a display element, not shown. The display element, formed of a liquid crystal panel or the like and electrically connected to the solid-state image pickup element 12, displays the object image formed on the solid-state image pickup element 12 thereon. Reference numeral 15 is a liquid crystal display panel which has a function similar to that of the viewfinder.

The zoom lens of the abovementioned embodiments is applied to the video camera or the like in this manner to realize an image pickup apparatus with a small size and high optical performance.

What is claimed is:

1. A zoom lens system comprising, in order from a front side to a rear side:
   a first lens unit which has a positive power;
   a second lens unit which has a negative power and consists of at least one negative lens element and a cemented lens formed by cementing a negative lens element to a positive lens element;
   a third lens unit which has a positive power; and
   a fourth lens unit which has a positive power,
   wherein said second lens unit and said fourth lens unit are moved in an optical axis direction during zooming, and the following condition is satisfied:

$$1.04 < |Rs1/Rs2| < 1.14$$

where Rs1 and Rs2 represent radii of curvature of a front lens surface and a rear lens surface of the negative lens constituting part of the cemented lens in said second lens unit, respectively.

2. The zoom lens system according to claim 1, wherein at least one of the following conditions is satisfied:

$$6.6 < \phi 1F/fw < 8.5$$

$$1.47 < \phi 1F/\phi 1R < 1.77$$

$$3.2 < \phi 1F/\phi 2F < 4.4$$

where φ1F represents an effective diameter of a frontmost surface of said first lens unit, φ1R represents an effective diameter of a rearmost surface of said first lens unit, φ2F represents an effective diameter of a frontmost surface of said second lens unit, and fw represents a focal length of the entire system at a short focal length end.

3. The zoom lens system according to claim 1, wherein at least one of the following conditions is satisfied:

$$1.8 < f1/fA < 2.4$$

$$0.1 < |f2/fA| < 0.44$$

$$1.0 < f3/f4 < 1.4$$

$$0.2 < |\beta 4T| < 0.32$$

where fw and ft represent focal lengths of the entire system at the short focal length end and at a long focal length end, respectively, fi represents a focal length of the ith lens unit, β4T represents an image forming magnification of said fourth lens unit when an object at infinity is brought into focus at the long focal length end, and fA is represented by:

$$fA = \sqrt{fw \cdot ft}.$$

4. The zoom lens system according to claim 1, wherein the following condition is satisfied:

$$35 = \nu a = 47$$

where νa represents an Abbe number of a material constituting the negative lens element of the cemented lens in said second lens unit.

5. The zoom lens system according to claim 1, wherein said third lens unit has a positive lens element which has a front convex lens surface and has an aspheric surface on at least one side, and a rearmost meniscus negative lens element which has a rear concave surface.

6. The zoom lens system according to claim 5, wherein said third lens unit consists of three or less lens elements.

7. The zoom lens system according to claim 1, wherein said fourth lens unit has a cemented lens formed by cementing a biconvex positive lens element which has an aspheric surface on at least one side to a negative lens element.

8. The zoom lens system according to claim 1, wherein at least a part of said third lens unit is moved to have a component perpendicular to the optical axis.

9. The zoom lens system according to claim 1, wherein said zoom lens system forms an image on a solid-state image pickup element.

10. A zoom lens system comprising, in order from a front side to a rear side:
    a first lens unit which has a positive power;
    a second lens unit which has a negative power;

a third lens unit which has a positive power; and a fourth lens unit which has a positive power, wherein said second lens unit and said fourth lens unit are moved in an optical axis direction during zooming, and the following condition is satisfied:

$$6.6 < \phi1F/fw < 8.5$$

where $\phi1F$ represents an effective diameter of a frontmost surface of said first lens unit, and fw represents a focal length of the entire system at a short focal length end.

11. The zoom lens system according to claim 10, wherein said zoom lens system forms an image on a solid-state image pickup element.

12. A zoom lens system comprising, in order from a front side to a rear side:

a first lens unit which has a positive power;

a second lens unit which has a negative power;

a third lens unit which has a positive power; and a fourth lens unit which has a positive power, wherein said second lens unit and said fourth lens unit are moved in an optical axis direction during zooming, and the following condition is satisfied:

$$1.47 < \phi1F/\phi1R < 1.77$$

where $\phi1F$ represents an effective diameter of a frontmost surface of said first lens unit, and $\phi1R$ represents an effective diameter of a rearmost surface of said first lens unit.

13. The zoom lens system according to claim 12, wherein said zoom lens system forms an image on a solid-state image pickup element.

14. A zoom lens system comprising, in order from a front side to a rear side:

a first lens unit which has a positive power;

a second lens unit which has a negative power;

a third lens unit which has a positive power; and a fourth lens unit which has a positive power, wherein said second lens unit and said fourth lens unit are moved in an optical axis direction during zooming, and the following condition is satisfied:

$$3.2 < \phi1F/\phi2F < 4.4$$

where $\phi1F$ represents an effective diameter of a frontmost surface of said first lens unit, and $\phi2F$ represents an effective diameter of a frontmost surface of said second lens unit.

15. The zoom lens system according to claim 14, wherein said zoom lens system forms an image on a solid-state image pickup element.

16. An image pickup apparatus comprising:

the zoom lens according to claim 1; and a solid-state image pickup element which receives light of an image formed by said zoom lens.

17. The image pickup apparatus according to claim 16, wherein the following condition is satisfied:

$$\tan\omega w = 0.62$$

where $\omega w$ represents a maximum field angle of said zoom lens determined by an effective size of said image solid-state image pickup element.

18. An image pickup apparatus comprising:

the zoom lens according to claim 10; and a solid-state image pickup element which receives light of an image formed by said zoom lens.

19. The image pickup apparatus according to claim 18, wherein the following condition is satisfied:

$$\tan\omega w = 0.62$$

where $\omega w$ represents a maximum field angle of said zoom lens determined by an effective size of said image solid-state image pickup element.

20. An image pickup apparatus comprising:

the zoom lens according to claim 12; and a solid-state image pickup element which receives light of an image formed by said zoom lens.

21. The image pickup apparatus according to claim 20, wherein the following condition is satisfied:

$$\tan\omega w = 0.62$$

where $\omega w$ represents a maximum field angle of said zoom lens determined by an effective size of said image solid-state image pickup element.

22. An image pickup apparatus comprising:

the zoom lens according to claim 14; and a solid-state image pickup element which receives light of an image formed by said zoom lens.

23. The image pickup apparatus according to claim 22, wherein the following condition is satisfied:

$$\tan\omega w = 0.62$$

where $\omega w$ represents a maximum field angle of said zoom lens determined by an effective size of said image solid-state image pickup element.

* * * * *